Feb. 13, 1923.
K. F. KRUGER
ATTACHMENT FOR FARM IMPLEMENT WHEELS
Filed June 9, 1922
1,444,795
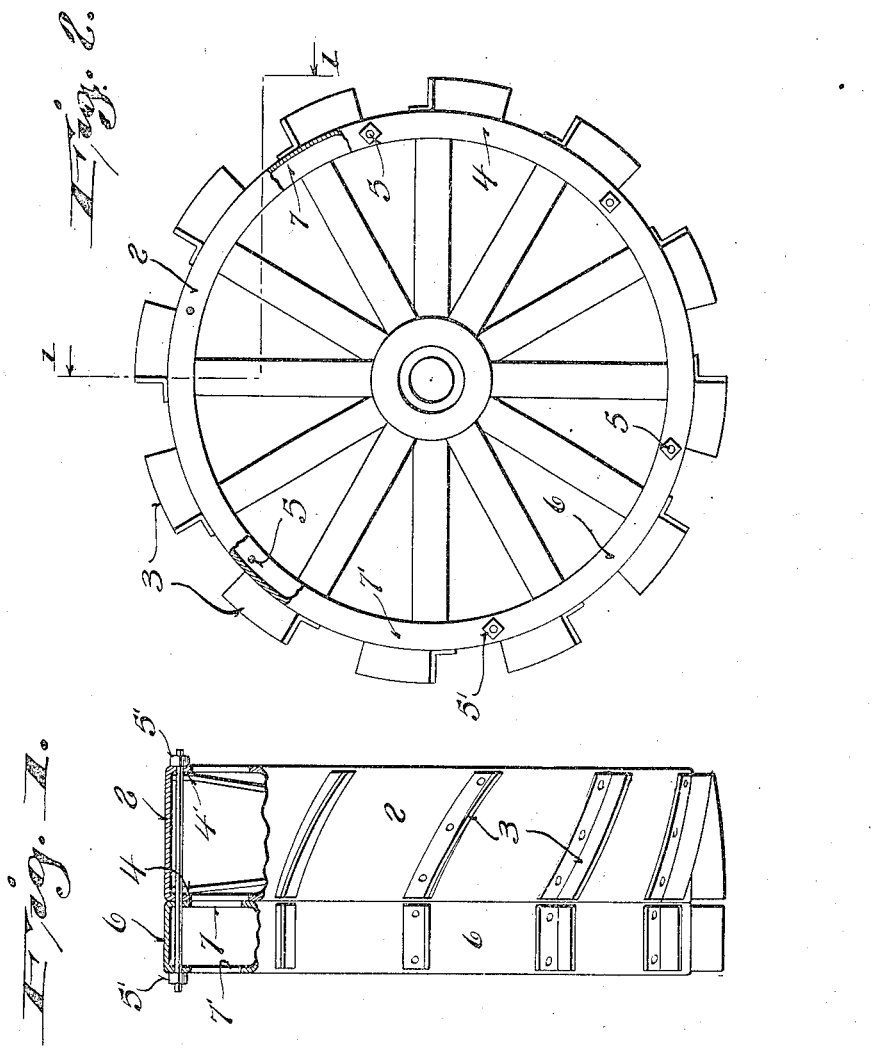

Patented Feb. 13, 1923.

1,444,795

UNITED STATES PATENT OFFICE.

KARL F. KRUGER, OF MILTON JUNCTION, WISCONSIN.

ATTACHMENT FOR FARM-IMPLEMENT WHEELS.

Application filed June 9, 1922. Serial No. 567,028.

*To all whom it may concern:*

Be it known that I, KARL F. KRUGER, a citizen of the United States, and resident of Milton Junction, in the county of Rock and State of Wisconsin, have invented certain new and useful Improvements in Attachments for Farm-Implement Wheels; and I do hereby declare the following is a full, clear, and exact description thereof.

My invention refers to traction wheels for motor-driven farm implements, and it has for its object to provide an auxiliary tread or attachment to the wheel, whereby its traction surface is increased for operating in soft or muddy ground under conditions which would render the ordinary tread inoperative, due to the load it would be called upon to sustain, the normal tread, under which conditions, would sink into the mire.

The primary object of my invention is to provide an auxiliary rim or tread for inturned flanged wheels, which auxiliary tread has complementary inturned flanges, one of the same being adapted to engage the outer flange of the wheel tread, for the reception of a series of tie-rods in the form of bolts, which extend through complementary apertures both in the wheel rim, and auxiliary tread, whereby the attachment can be quickly and readily secured to the wheel rim, and whereby tie-rods, which extend the entire width of the companion treads, will be braced at intervals by the rim flanges for reinforcing purposes, to resist load strain that would otherwise tend to spread or separate the auxiliary rim from the wheel rim, it being understood that the tie-rods are provided with nuts or heads, whereby the parts are firmly drawn together.

It is, also, understood that the wheel tread and its associated auxiliary tread or rim may be provided with any standard type of gripping lag.

With the above and other objects in view, the invention consists in certain details of construction and combination of parts as are hereinafter set forth with reference to the accompanying drawings and subsequently claimed.

In the drawings:—

Figure 1 represents a plan view of a wheel having attached thereto an auxiliary tread embodying the features of my invention, parts of the wheel and auxiliary rim being broken away and other parts in section to more clearly illustrate the structural features, and Figure 2 is a side elevation of the same, partly broken away and in section.

Referring by characters to the drawing, 1 represents the hub of a standard tractor wheel, the spokes of which support a rim or tread 2, which tread has suitably attached thereto a series of tractor lags 3 of any desired formation. The inner and outer edges of the wheel tread are provided with inturned flanges 4—4', which flanges are provided with alined apertures at suitable intervals about the diameter of the wheel for the reception of tie-bolts 5.

When it is desired to attach the auxiliary tread to widen the tread face of the tractor wheel, a series of these tie-bolts are fitted through the flange apertures of the wheel and their outer ends project a predetermined distance from the outer face of the wheel for the reception of an auxiliary tread band 6. This auxiliary tread band is of approximately the same diameter as the wheel tread and it is provided with corresponding inner and outer flanges 7—7', which are provided with complementary apertures that are alined with the wheel apertures, for the purpose of receiving the tie-bolt extensions.

Hence it will be seen that when the auxiliary tread is adjusted in position, its inner flange 7 engages the outer flange 4 of the wheel tread and heads or nuts 5', which are in threaded union with the tie-bolt ends, when tightened will firmly bind the wheel rim and extension tread together, whereby they, in effect, are a single unit of predetermined width. By employing this simple mechanism for attaching the auxiliary tread, it will be seen that the outer and intermediate associated set of tread flanges form braces for the tie rods, whereby load strain, which might be directly put upon the tread extension, will not tend to spread or twist the same from its alined position with relation to the wheel, for the reason that these braced tie-rods will effectually resist such spreading strain, due to their braced engagement of the parts.

It will, also, be understood that the auxiliary tread can be provided with suitable gripping lags similar to those used in connection with the wheel tread, or these auxiliary lags may be varied in shape from that of the wheel tread, if desired. It is apparent that the parts can be readily attached or detached, if desired, and, owing to the simplicity of the device, the problem of a mud wheel has been solved, whereby the manufacturing cost is reduced to a minimum and the device so arranged that it can readily be fitted or detached without the aid of a skilled mechanic, the only tool necessary being a wrench for tightening up the tie-bolt nuts or heads.

I claim:—

In a tractor wheel provided with a rim having inturned flanges at its inner and outer edges, the flanges being provided with companion sets of alined bolt receiving apertures; the combination of an attachment comprising an auxiliary rim having inturned flanges corresponding to the flanges of the wheel rim and having complementary apertures which correspond with the wheel rim apertures, the inner flange of the auxiliary rim being in abutting engagement with an outer flange of the wheel rim, bolts extending through each alined series of wheel rim and auxiliary rim apertures from the inner flange of the wheel to the outer flange of the auxiliary rim, and nuts or heads engageable with the surfaces of the inner wheel rim flange and outer auxiliary rim flange, the bolts being intermediately braced by the associated flanges to resist load strain tending to spread the wheel rim and auxiliary rim apart.

In testimony that I claim the foregoing I have hereunto set my hand at Milton Junction, in the county of Rock and State of Wisconsin.

KARL F. KRUGER.